July 14, 1942.  P. F. SPERRY  2,289,600
MOTION PICTURE CAMERA
Filed Jan. 13, 1940   4 Sheets-Sheet 1
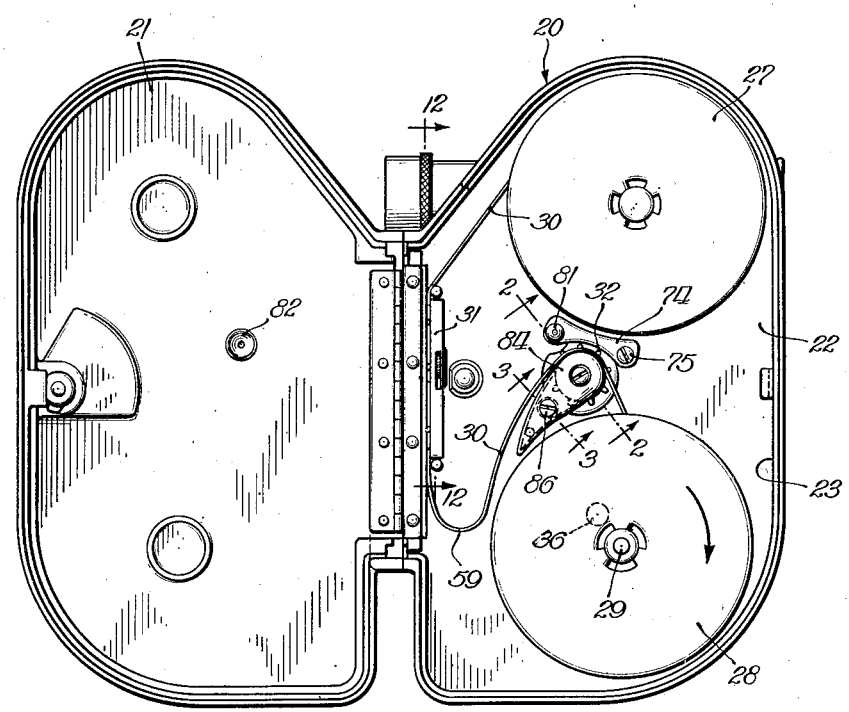
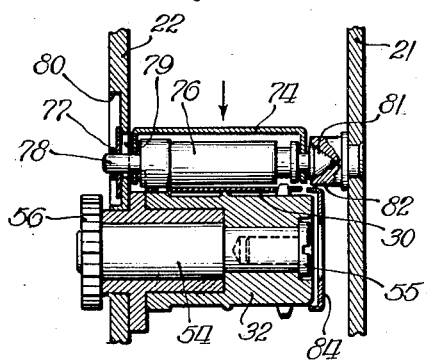
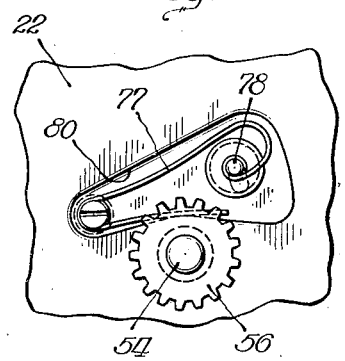
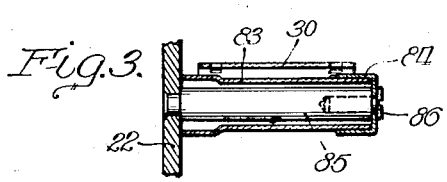
INVENTOR.
Philmore F. Sperry
BY
ATTORNEYS.

July 14, 1942.　　P. F. SPERRY　　2,289,600
MOTION PICTURE CAMERA
Filed Jan. 13, 1940　　4 Sheets-Sheet 2

INVENTOR.
Philmore F. Sperry
BY
ATTORNEYS.

July 14, 1942.  P. F. SPERRY  2,289,600
MOTION PICTURE CAMERA
Filed Jan. 13, 1940     4 Sheets-Sheet 3
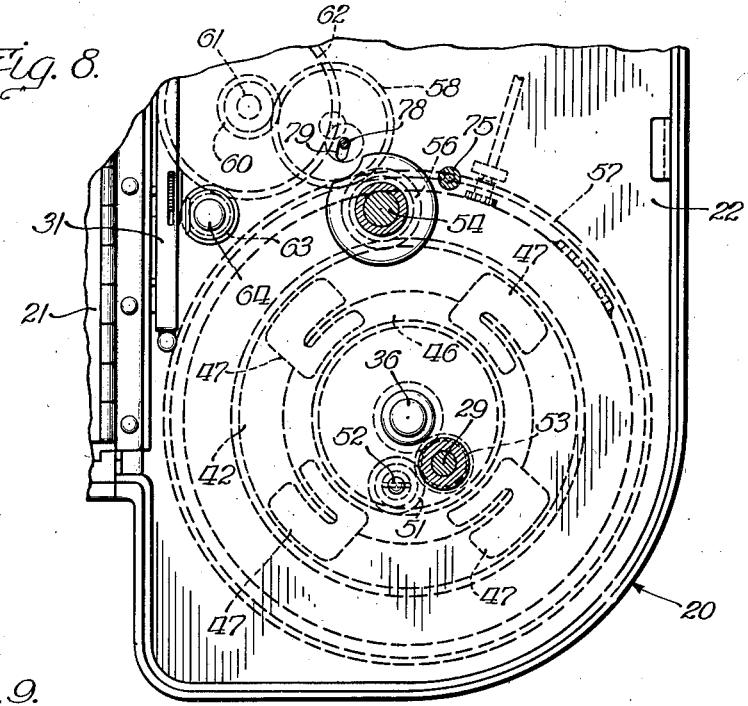
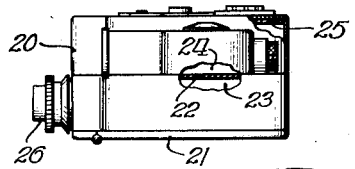
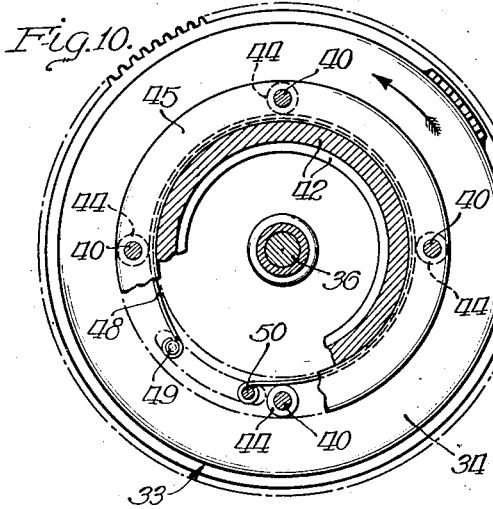
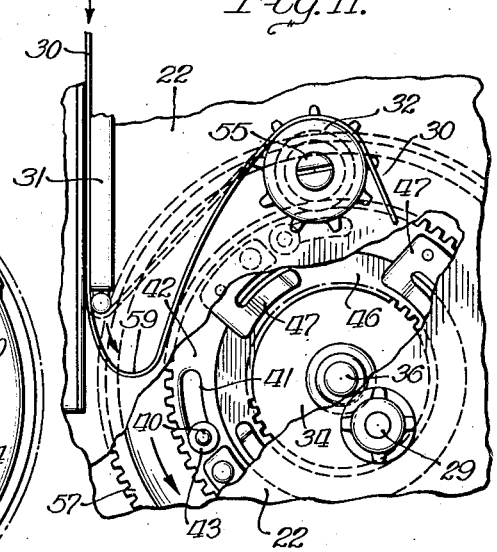
INVENTOR.
Philmore F. Sperry
BY
ATTORNEYS.

July 14, 1942. P. F. SPERRY 2,289,600
MOTION PICTURE CAMERA
Filed Jan. 13, 1940 4 Sheets-Sheet 4
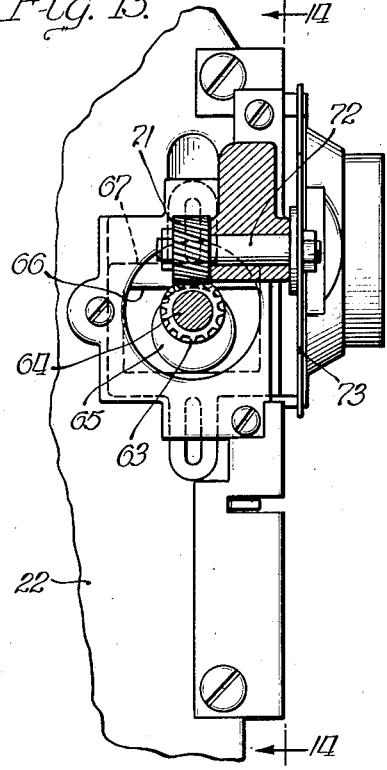
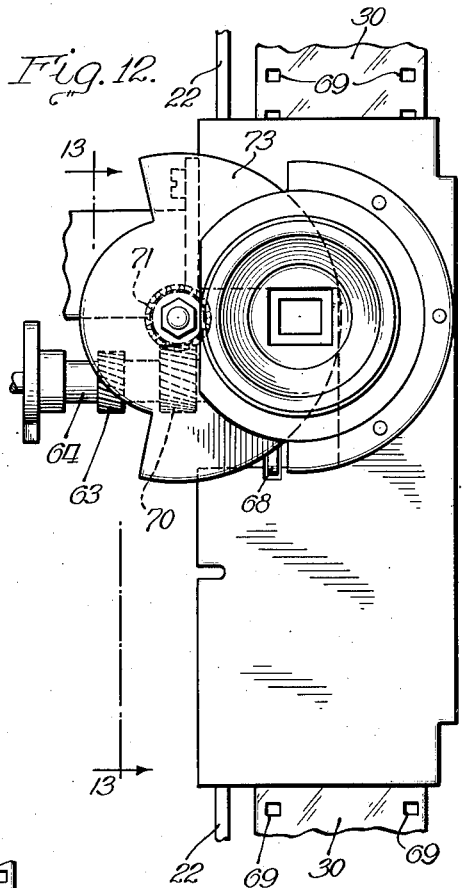
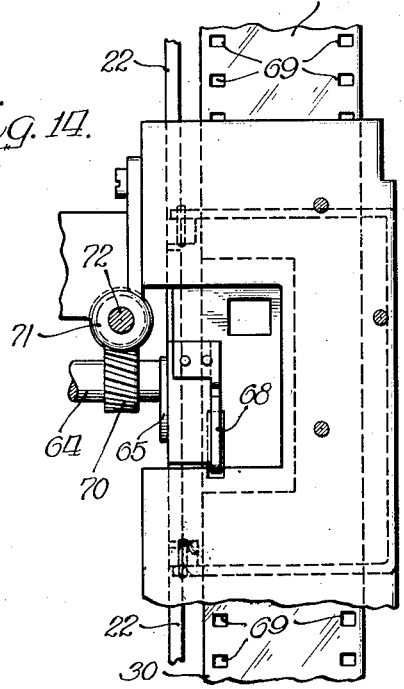
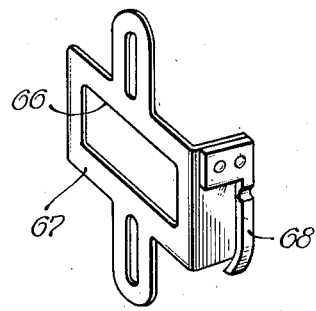
INVENTOR.
Philmore F. Sperry
BY
ATTORNEYS.

Patented July 14, 1942

2,289,600

UNITED STATES PATENT OFFICE 2,289,600

MOTION PICTURE CAMERA

Philmore F. Sperry, Chicago, Ill., assignor to Revere Camera Company, Chicago, Ill., a corporation of Delaware Application January 13, 1940, Serial No. 313,665

10 Claims. (Cl. 88—17)

This invention relates to improvements in motion picture cameras in the use of which a film is to be threaded into operative position, with a loop in the film as usual for permitting the portion of the film adjacent to the loop to be moved past the lens of the camera by an intermittent motion while the leading end portion of the film is being wound on a reel or spool by power applied continuously during the operation of the camera. It is the principle object of the invention to provide a new and improved form and arrangement of parts for giving the film an intermittent motion for its movement past the lens and for effecting the rewinding of the film, and particularly for providing an arrangement by which a loop of adequate size is provided automatically at the desired point in case the operator may forget or neglect to provide such a loop.

In the improved construction by which the desired results are attained, a lost-motion arrangement is provided in the train of driving means for the rewinding mechanism for the film, while the means for giving the film its intermittent motion is actuated immediately at the start of the operation of the driving motor. As a result of this construction, the portion of the film moving past the lens for exposure gains on the leading end portion of the film at the start of the operation of the camera after the threading of a film into position in the camera since the rewinding mechanism begins to operate only when the lost motion has been taken up, with the result that a loop is provided between the intermittent movement means and the rewinding means. A spring is provided in connection with the lost-motion arrangement which automatically reestablishes the lost-motion condition when the film is removed from the camera so as to insure that the mechanism shall be in condition for producing the loop when a new film is threaded into the camera ready for a new operation.

In the mechanism as shown, the lost-motion arrangement comprises a member by which power is applied to the film both for giving the film its intermittent motion and for rewinding the film, with pins on said power member working in slots in the gear by which motion is transmitted to the rewinding mechanism, a light spring being mounted so as to bear on said power member and said gear for holding the gear normally at the limit of its forward movement with respect to said power member as provided by said lost-motion means. The arrangement is such that when there is no film in the camera the lost motion condition is always present in the driving means for rewinding. Thus the formation of the loop is assured upon each rethreading operation, such result being brought about automatically without attention on the part of the operator.

In the arrangement shown, improved means is provided for the application of the power for rewinding the film, comprising two ring gears, one mounted to rotate within a concentrically located recess in the other, with a series of spring fingers carried by one gear and bearing on the face of the other gear for producing the desired frictional effect by which a yielding overdrive for the rewinding reel is provided for taking care of the variable effective size of the reel as the film is rewound thereon.

It is another object of the invention to provide an improved arrangement of retainer means by which the film may be held from accidental disengagement from the sprocket wheel by which the loop is maintained adjacent to the gate mechanism of the camera.

It is another object of the invention to improve motion picture cameras in sundry details hereinafter pointed out. The preferred means by which the several objects have been attained are illustrated in the accompanying drawings, in which—

Fig. 1 is a side view of a camera embodying the invention, with the side door of the camera open and with a film threaded into operative position in the camera;

Figs. 2 and 3 are sectional views taken substantially at the line 2—2 and the line 3—3 of Fig. 1, but with certain of the parts in slightly changed position in Fig. 2;

Fig. 4 is a view of the parts shown in Fig. 2 as seen from the left in said figure;

Fig. 8 is a view of the lower portion of the camera as seen in Fig. 1, but with the film sprocket and the rewinding reel removed and with additional parts indicated in dotted lines;

Fig. 9 is a top plan view of the camera on a smaller scale with portions of the casing broken away at two points;

Fig. 10 is a vertical sectional view taken substantially at the line 10—10 of Fig. 7 but on a reduced scale;

Fig. 11 is similar to a portion of Fig. 1 but on an enlarged scale, with parts removed and with other parts broken away for clearness of illustration;

Fig. 12 is a vertical sectional view taken substantially at the line 12—12 of Fig. 1;

Fig. 13 is a vertical sectional view taken substantially at the line 13—13 of Fig. 12;

Fig. 14 is a vertical sectional view taken substantially at the line 14—14 of Fig. 13; and Fig. 15 is a perspective view of the slidably mounted operating member by which intermittent motion is given to the film.

Figure 5:
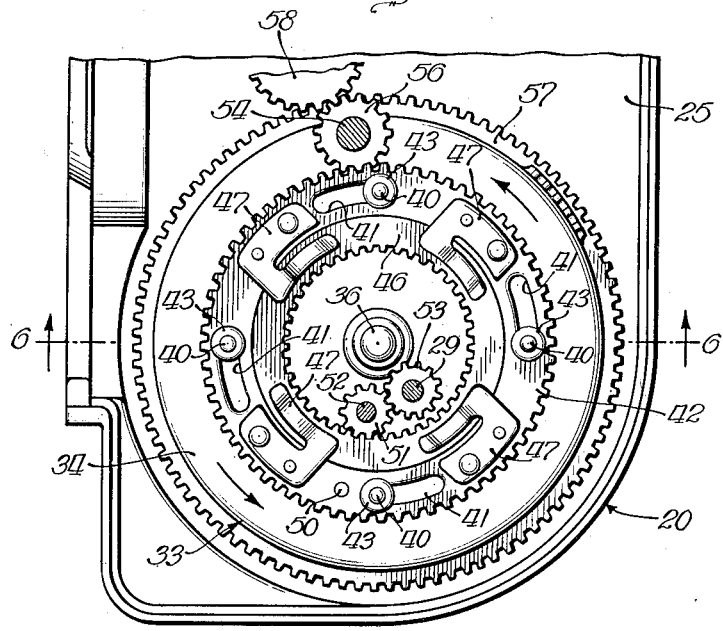
Fig. 5 is a view of the lower portion of the camera from the same side as in Fig. 1 but with the middle partition removed.

Referring now to the several figures of the drawings, in which corresponding parts are indicated by the same reference characters, 20 indicates the casing of the improved camera having a door 21 hingedly mounted at one side face, a partition 22 dividing the interior of the casing into two compartments 23 and 24, and a side plate 25 located opposite to the intermediate plate 22, as is best indicated in Fig. 9. In the construction illustrated, the motor and the major portion of the operating parts are located in the compartment 24, while the film supporting and moving parts are located in the compartment 23 for moving a film past a lens structure 26 communicating with the compartment 23, as is indicated in said Fig. 9.

The means for supporting a film in the camera and for moving it past the exposure point comprises an upper reel 27 rotatably mounted in position on the intermediate plate 22 so as to rotate freely in the camera, and a rewinding reel 28 mounted for rotation upon a shaft 29 which is driven by power applied thereto as hereinafter described. The upper reel 27 is designed to be placed in position in the camera with a supply of film 30 wound thereon which is adapted to be threaded through a gate mechanism 31 of any suitable type and led then to a sprocket wheel 32 from which it passes to the lower reel 28 for rewinding thereon. In the arrangement shown, a 16 mm. film is employed adapted to be run through the camera for exposure of half of the film at one side throughout the full length of the film, after which the film is to be reinserted in the camera and run through a second time in reverse direction for exposure of the other half of the film. That is to say, for the second run of the film, the rewind reel 28 with the film thereon after the first exposure run would be turned through 180 degrees and placed in position at the top of the chamber 23 for the second exposure run. For assisting the operator in keeping his records straight with respect to what has been done, the reels 27 and 28 are differentiated in appearance at their opposites sides, as is clearly shown in Fig. 1.

Figure 6:
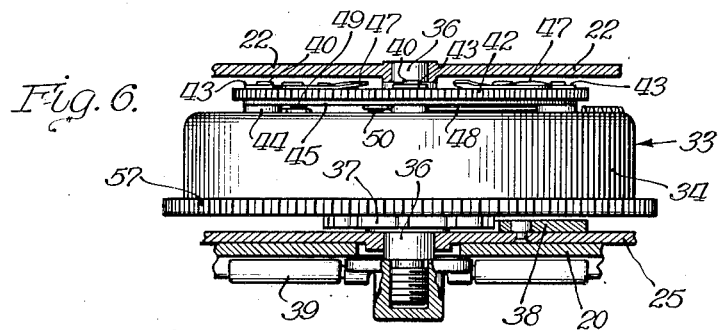
Fig. 6 is a horizontal sectional view taken substantially at the line 6—6 of Fig. 5.

The power for carrying the film 30 forwardly past the exposure point comprises in the arrangement shown a spring motor 33 (see Fig. 6), such motor comprising a housing 34 within which a coiled flat spring 35 is mounted, one end of the spring being connected with an arbor 36 and the opposite end being connected with the housing. The housing 34 is preferably held against rotation by the spring by means of a releasable latch mechanism of any approved type preferably operable from the exterior of the camera for controlling the operation of the camera. The arbor 36 is held against rotation in reverse direction by means of latching means of any approved type comprising in the arrangement shown a ratchet wheel 37 fixed on said arbor so as to cooperate with a pawl 38 pivotally mounted on the side plate 25. The arbor 36 is rotated for winding the motor by means of a handle 39 of any approved type, the handle 39 in the arrangement shown being adapted to fold down into retracted position, as shown in Fig. 6. The arrangement is such that when the motor has been wound, the spring 35 is effective for turning the housing 34 in counterclockwise direction in Fig. 5.

Figure 7:
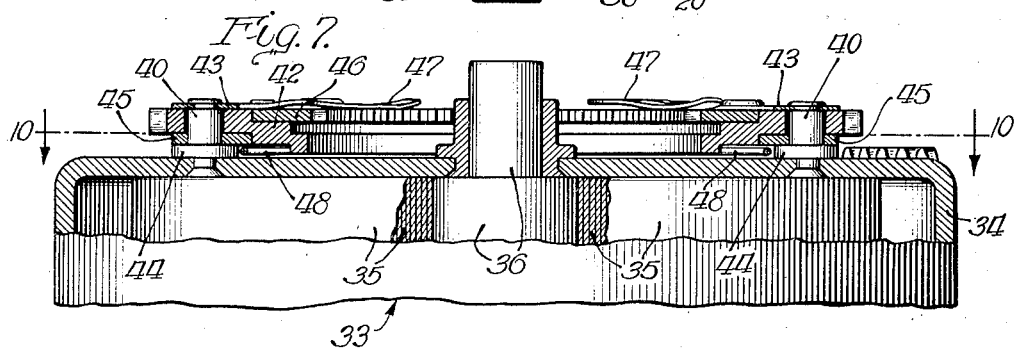
Fig. 7 is a view similar to Fig. 5 but on a larger scale and with more parts shown in section.

As is best shown in Fig. 7, the housing 34 is provided with a plurality of pins 40 thereon which extend through slots 41 in a ring gear 42, the gear 42 being held against removal from the pins by means of washers 43, as is best shown in Fig. 7. As is clearly shown in said Fig. 7, the pins 40 are provided with spacers 44 thereon adapted to hold a bearing ring 45 in engagement with the inner face of the gear 42.

In a recess in the outer face of the gear 42, an internal ring gear 46 is mounted, such gear 46 being held in position by means of a plurality of spring members 47 carried by the gear 42 and pressing upon the outer face of the gear 46, such springs serving to cause the gear 46 to move yieldingly by friction with the ring 42.

As is best shown in Fig. 10, the gear 42 is connected with the motor housing 34 by means of a spring 48, such spring being connected with the housing 34 by means of a pin 49 at one end of the spring and being connected with the gear at its opposite end by means of a pin 50, as is best shown in Fig. 10. The spring 48 and its connections are such that when the parts are free to move the spring holds the gear 42 moved to the limit of its forward motion in counterclockwise direction in Fig. 5 with respect to the motor housing 34. The arrangement is such that when there is any substantial resistance to the movement of the gear 42 in counterclockwise direction in Fig. 5, the spring yields for permitting the pins 40 to travel along the slots 41 into the position as shown in Fig. 11. When the lost-motion afforded by the pin and slot connection between the gear and the motor housing has been taken up, the gear 42 is thereafter driven positively in counterclockwise direction in said Figs. 5 and 7 with the motor housing 34.

Means is provided for driving the lower reel 28 in clockwise direction in Fig. 1 from the internal gear 46. This means comprises an idler pinion 51 meshing with said gear 46, said pinion 51 being rotatably mounted upon a pin or lug 52 carried by the middle partition 22. The pinion 51 meshes in turn with a pinion 53 carried by the shaft 29 upon which the lower reel 28 is mounted.

The sprocket 32 is also driven from the gear 42. As is clearly shown in Fig. 2, the sprocket wheel 32 is supported by a short shaft 54 journaled in the partition plate 22, being held in position on the end of said shaft by means of a set screw 55. The shaft 54 is driven by a pinion 56 meshing with the gear 42, as is clearly shown in Fig. 5. The arrangement is such that the sprocket wheel 32 moves the film 30 forwardly at the same rate as that at which the intermittent movement means carries the film past the point of exposure in the camera.

The arrangement is such that as the film is wound upon the lower reel, such reel has a tendency to increase the speed of movement of the film. This tendency for an increase in the speed of movement of the film is counteracted however by the sprocket wheel 32 which holds the film back to its normal constant speed, this being made possible by reason of the frictional connection between the gear 42 and the gear 46.

The intermittent movement means for advancing the film past the point of exposure is preferably of the same type as that shown in my co-pending application Serial No. 349,397, filed August 2, 1940. For actuating such intermittent movement means, a gear 57 is provided fixedly mounted upon the housing 34 and meshing with a pinion 58 by which the power is applied to the intermittent movement means. The arrangement is such that the intermittent movement means start to operate promptly at the start of the operation of the motor 33, following the threading of a film into position in the camera. Since the rotation of the sprocket wheel 32 and the drive of the rewinding reel 28 do not begin until the lost-motion provided by the slots 41 is taken up, it follows that the intermediate portion of the film gains on the leading end portion for a short period so as to provide a loop at 59 ahead of the gate mechanism 31 and between the intermittent movement means and the sprocket wheel 32.

In the arrangement illustrated, the pinion 58 (see Fig. 8) meshes with a pinion 60 carried by a shaft 61 which is provided with a gear 62 meshing with a pinion 63 mounted on a shaft 64. The shaft 64 (see Fig. 13) is provided with an eccentric 65 which operates in the opening 66 of a slidably mounted plate 67 which is provided at one end with a spring tooth 68 which engages the openings 69 in the film 30. When the shaft 64 is rotated so as to reciprocate the plate 67, the tooth 68 engages one of the openings 69 in the film upon the downward movement for advancing the film downwardly. Upon the upward movement of the plate 67, the film 30 is left in stationary position for the desired exposure. The shaft 64 through the medium of intermeshing pinions 70 and 71 also drives a shaft 72 carrying a shutter 73 for preventing access of light to the film at the time when it is being moved and for permitting the light to have access to the film when the film is in stationary position. Inasmuch as this apparatus forms in and of itself no part of the present invention, it is believed to be unnecessary to describe the same in more detail herein.

In view of the importance of the continued engagement of the film with the sprocket wheel 32 during the operation of the film supporting and moving means, a spring-actuated pressure member is provided for engaging the portion of the film adjacent to the sprocket wheel for holding the film in position thereon. This means comprises in the arrangement shown an arm 74 formed of sheet metal bent into shape as is clearly shown in Fig. 2, such arm being pivotally mounted upon a screw 75 carried by the intermediate partition 22. At its free end, the arm 74 is provided with a roller 76 rotatably mounted therein in position to engage the film 30 mounted on the sprocket wheel 32, as is clearly shown in Fig. 2, so as to prevent the film from becoming accidentally disengaged from the teeth of the sprocket wheel. The arm 74 is normally pressed downwardly toward the sprocket wheel 32 by a spring 77 which is mounted at the pivotal axis of the arm 74 with one of its end portions engaging the reduced end portion 78 of the roller 76, as is clearly shown in Fig. 4. The reduced end portion 78 of the roller extends through a slot 79 in the partition plate 22, the spring 77 being located within a recess 80 formed in the face of the plate 22, as is clearly shown in said Fig. 2. At the opposite side of the arm 74, the roller 76 is provided with a tapered end portion 81. When the arm 74 is in its raised position under the influence of the spring 77, with the camera door 21 open, the tapered end portion 81 is held in position for engagement with a flared socket member 82 carried by the door. When the door 21 is closed, the flared socket member 82 engages the tapered end portion 81 of the roller for forcing the roller 76 and the arm 74 downwardly by a wedging action against the force of the spring 77.

A guard or guide is provided in connection with the sprocket wheel 32 comprising a body portion 83 formed of sheet metal bent into shape, and a side wall member 84 by which the guard is mounted in position upon a pin 85 through the medium of a machine screw 86, as is best shown in Fig. 3. The side wall portion of the guard 84 projects upwardly opposite the end of the sprocket wheel, as is clearly shown in Figs. 1 and 2.

By the use of the improved construction as above described, the difficulty of operating the camera is reduced to a minimum so that good results can be had with the camera by operators having very little skill and paying a minimum of attention to the mode of operation. If the operator produces a loop in threading the film into the camera, such loop is automatically increased in size to a limited extent by the mechanism as above explained. If the operator fails to provide any loop, a loop of adequate size is provided by the mechanism at the start of the operation of the motor following the threading of the film into the camera. The strength of the spring 48 is such as to insure that the parts shall be in their desired relative positions when there is no film in the camera. The spring is weak enough however that upon the application of power for driving the gear 42 in counterclockwise direction in Fig. 5 the pins 40 will move along the slots 41 against the action of the spring without moving the gear 42 until the lost-motion is taken up so as to provide for positive driving of the gear 42 thereafter. If the spring 48 should at any time be strong enough to return the parts to the positions as shown in Fig. 5 at any cessation of the operation of the motor, the loop would be again established at 59 promptly at the start of the operation of the motor thereafter.

While the form and arrangement of parts as shown and as above described are preferred, the invention is not to be limited thereto except so far as the claims may be so limited, it being understood that changes might well be made in the form and arrangement of parts without departing from the spirit of the invention.

I claim:

1. In a film handling mechanism, the combination of means adapted by engagement with a film at an intermediate point therealong to give the engaged portion of the film an intermittent motion lengthwise, a sprocket adapted by engagement with the film at a more advanced point therealong to control the movement of the leading end portion of the film, means for driving said intermittent motion means, means for driving said sprocket comprising two members movable into lost-motion relationship to each other whereby at the start of a driving operation after said lost-motion relationship has been established one of said members remains stationary for a short period while the other member moves, and means adapted normally to hold said two members yieldingly in their lost-motion relationship when the parts are free to move independently of a film thereon.

2. In a film handling mechanism, the combination of means adapted by engagement with a film at an intermediate point therealong to give the engaged portion of the film an intermittent motion lengthwise, a sprocket adapted by engagement with the film at a more advanced point therealong to control the movement of the leading end portion of the film, means comprising a power motor for driving said sprocket and said intermittent motion means and having a lost motion connection with said sprocket adapted normally at the start of a driving operation to apply power effectively at first only to the intermittent motion means so as to take up said lost motion and to provide slack in the film between the intermittent motion means and the sprocket and adapted later to apply power to said sprocket for moving the leading end portion of the film, and yielding means adapted to yield initially for permitting the lost-motion to be taken up and serving by its own resiliency to reestablish the lost motion condition between the motor and the sprocket when the tension of the drive has been relieved and the parts are free to move.

3. In a film handling mechanism, the combination of a rotatable member, means operatively connected with said rotatable member for giving a portion of a film an intermittent motion lengthwise throughout the movement of said rotatable member, a second rotatable member adjacent to said first-named rotatable member and connected with said first rotatable member by lost motion means for rotating said second rotatable member, yielding means bearing on said two rotatable members serving normally when there is no film in position on said members to hold said second rotatable member moved yieldingly to its foremost position with respect to said first rotatable member as made possible by the provision of the lost motion means but adapted to yield for causing the second rotatable member to move to its rearmost position with respect to the first rotatable member for taking up the lost-motion when there is a film in position, and means operatively connected with said second rotatable member for giving a portion of the film at a more advanced point therealong a continuous movement lengthwise throughout the movement of said second rotatable member.

4. In a film handling mechanism, the combination of a rotatable member, means operatively connected with said rotatable member for giving a portion of a film an intermittent motion lengthwise throughout the movement of said rotatable member, a second member rotatable about the axis of said first rotatable member and connected with said first rotatable member by means comprising a driving pin carried by one of the members and extending through a slot in the other member for rotating said other member, a spring adapted to apply pressure yieldingly from one of said rotatable members to the other and serving normally when the parts are free to move to hold said second rotatable member moved yieldingly to its foremost position with respect to said first rotatable member as made possible by the provision of the pin and slot connection between said two members, and means operatively connected with said second rotatable member for giving a portion of the film at a more advanced point therealong a continuous movement lengthwise throughout the movement of said second rotatable member.

5. In a film handling mechanism, the combination of a motor comprising a plate member adapted to be rotated at uniform speed, means operatively connected with said plate member for giving a portion of a film an intermittent motion lengthwise throughout the operation of the motor, a gear in concentric position with respect to the axis of said plate member, means comprising a pin carried by the plate member extending through a concentrically arranged slot in the gear for holding the gear in position on said plate member so as to be rotatable to a limited extent with respect thereto, yielding means connecting said gear with said plate member serving normally when the parts are free to move to hold the gear rotated yieldingly to its foremost position with respect to said plate member as made possible by the provision of the pin and slot connection between said plate member and said gear, and a sprocket wheel operatively connected with said gear for giving a portion of the film at a more advanced point therealong a continuous movement lengthwise throughout the rotary movement of said gear.

6. In a motion picture camera, the combination of a motor comprising a plate member adapted to be rotated at uniform speed, ring gear means mounted on said plate member so as to rotate therewith and having outwardly extending teeth about its periphery and inwardly extending teeth arranged about the central opening, means comprising a sprocket wheel and a pinion connected with said sprocket wheel and meshing with the outwardly extending teeth of said gear means for moving a film lengthwise, and means comprising a reel and a second pinion connected with the reel and meshing with the inwardly extending teeth of said gear means for driving the reel for winding the film thereon.

7. In a motion picture camera, the combination of a casing, a motor mounted in said casing and comprising a coiled flat spring and a housing extending about the spring with a substantially flat plate portion at the side of the spring and connected therewith so as to be rotated thereby, ring gear means mounted on said plate portion of the housing so as to rotate therewith and having outwardly extending teeth about its periphery and inwardly extending teeth arranged about the central opening, means comprising a sprocket wheel and a pinion connected with said sprocket wheel and meshing with the outwardly extending teeth of said gear means for moving a film lengthwise, and means comprising a reel and a second pinion connected with the reel and meshing with the inwardly extending teeth of said gear means for driving the reel for winding the film thereon.

8. In a motion picture camera, the combination of a rotatable driving member having a shallow recess in concentric position in one of its faces, a second driving member having a working fit in said recess, yielding bearing members carried by said first-named driving member adapted by pressure on the outer face of said second driving member to apply power yieldingly thereto by friction for causing said second driving member to rotate with said first-named driving member, means comprising a sprocket wheel operatively connected with said first-named driving member for moving a film lengthwise, and means comprising a reel operatively connected with said second driving member for driving the reel yieldingly for winding the film thereon.

9. In a motion picture camera, the combination of a casing, a motor mounted in said casing and comprising a coiled flat spring and a housing extending about the spring with a substantially flat plate portion at the side of the spring and connected therewith so as to be rotated thereby, a ring gear mounted on said plate portion of the housing so as to rotate therewith having outwardly extending teeth about its periphery and having a shallow recess in concentric position in its outer face, a second ring gear having a working fit in said recess and having inwardly extending teeth about its central opening, spring bearing members carried by said first-named gear adapted by pressure on the outer face of said second gear to apply power yieldingly thereto by friction for causing said second gear to rotate with said first-named gear, means comprising a sprocket wheel and a pinion connected with said sprocket wheel and meshing with the teeth of said first-named gear for moving a film lengthwise, and means comprising a reel and a second pinion connected with the reel and meshing with the teeth of said second gear for driving the reel for winding the film thereon.

10. In a motion picture camera, the combination of a light-proof casing comprising a door at one side adapted to be opened for threading a film into position, means comprising a sprocket wheel and a motor for driving the sprocket wheel for supporting and moving a film, a pressure member movable toward and from said sprocket wheel, a spring adapted normally to hold said pressure member out of operative relation to said sprocket wheel, and means actuated by the closure of said door for moving said pressure member toward the sprocket wheel against the action of said spring for holding the film from disengagement from said sprocket wheel.

PHILMORE F. SPERRY.